| United States Patent [19] | | [11] | 4,138,378 |
|---|---|---|---|
| Doss | | [45] | Feb. 6, 1979 |

[54] LIQUID POLYALKENE IN THERMOPLASTIC ELASTOMER SEALANT FORMULATION

[75] Inventor: Richard C. Doss, Bartlesville, Okla.

[73] Assignee: Phillips Petroleum Company, Bartlesville, Okla.

[21] Appl. No.: 864,121

[22] Filed: Dec. 23, 1977

[51] Int. Cl.$^2$ .................. C08K 5/01; C08L 51/00; C08L 93/00
[52] U.S. Cl. .................. 260/27 BB; 260/33.6 A; 260/33.6 AQ; 260/876 B; 260/880 B
[58] Field of Search ......... 260/33.6 A, 27 BB, 876 B, 260/880 B, 33.6 AQ

[56] References Cited

U.S. PATENT DOCUMENTS

| 3,239,478 | 3/1966 | Harlan | 260/876 B |
|---|---|---|---|
| 3,325,430 | 6/1967 | Grasley | 260/876 B |
| 3,333,024 | 7/1967 | Haefele et al. | 260/876 B |
| 3,441,530 | 4/1969 | Bauer et al. | 260/28.5 R |
| 3,817,904 | 6/1974 | Gagle et al. | 260/33.6 AQ |
| 3,850,858 | 11/1974 | Park | 260/27 BB |
| 3,917,607 | 11/1975 | Crossland et al. | 260/876 B |
| 3,923,722 | 12/1975 | Lakshmanan | 260/33.6 A |
| 3,925,947 | 12/1975 | Meyers et al. | 52/208 |
| 3,932,341 | 1/1976 | Kutch et al. | 260/27 BB |
| 3,935,893 | 2/1976 | Stang et al. | 260/876 B |

Primary Examiner—Ronald W. Griffin

[57] ABSTRACT

A hydrogenated thermoplastic elastomer and a low molecular weight polyalkene plasticizer in a sealant formulation containing a modifying resin and a filler provides a sealant composition having a good balance of properties.

11 Claims, No Drawings

LIQUID POLYALKENE IN THERMOPLASTIC ELASTOMER SEALANT FORMULATION

BACKGROUND OF THE INVENTION

This invention relates to polymer sealant compositions.

It is known to use rubbery materials such as styrene/butadiene copolymers in sealant compositions. However, high performance sealant compositions have generally been limited to more expensive materials such as polysulfides, polymercaptans, polyurethanes, and silicones because of the difficulty of getting a good balance of properties in the less expensive rubber compositions. For instance, one of the requirements for a sealant, obviously, is a good stability to weathering. However, the unsaturation present in ordinary rubber compositions tends to make such compositions susceptible to attack by oxygen and ozone. This can be alleviated by hydrogenation but hydrogenation tends to reduce one of the beneficial aspects of such rubbery materials, the good elongation. It is known to use plasticizers to improve the flexibility of sealant compositions but some plasticizers tend to sensitize the formulation to ultraviolet light, thus making the stability worse. Also, many plasticizers are not compatible with other ingredients in the polymer or given surface tack. Polyalkenes are known for use as plasticizers but these materials tend to be incompatible with unsaturated rubbery materials.

Thus, it is apparent that heretofore the typical formulation of a sealant composition has involved a compromise between competing properties, with variations in the formulation which enhance one property tending to cause a deterioration in others. Another aspect of this situation is the desirability that the sealant adhere reasonably well to the sides of the joint or crack to which it is applied, yet after the sealant is set, it is undesirable for it to have a tacky exposed surface.

SUMMARY OF THE INVENTION

It is an object of this invention to provide a sealant formulation having both good flexibility and the ability to withstand weathering; and it is a further object of this invention to provide a sealant formulation which has good adhesion and yet which, on curing, is not tacky.

In accordance with this invention, there is provided a sealant formulation comprising a thermoplastic elastomer, a low molecular weight polyalkene, a modifying resin, and a filler.

DESCRIPTION OF THE PREFERRED EMBODIMENTS

The rubbery constituent of this invention is a hydrogenated thermoplastic elastomer. By thermoplastic elastomer is meant a material which is rubbery in the solid state and yet which can be remelted in the same manner as other thermoplastics. Typical rubbery compositions have little strength until they are chemically crosslinked. Since this is an irreversible reaction, the thus-cured rubber cannot be remelted. Recently, new classes of rubbery materials have been developed called thermoplastic elastomers, which have high strength without chemical crosslinking. These materials have a central rubbery block and at least two terminal resinous blocks. It is believed the polymers exhibit their unique characteristics because the terminal resinous blocks form crystal structures which act in a manner similar to the chemical crosslinking of conventional rubbers but which can be remelted in the same manner as can other crystal structures. These thermoplastic elastomers are sometimes referred to hereinafter as teleblock copolymers because of the presence of at least two terminal resinous blocks, which it is believed are responsible for the thermoplastic elastomeric characteristics thereof.

The thermoplastic elastomer used in the new sealant formulation of this invention is a hydrogenated linear or radial thermoplastic elastomer of a conjugated diene and a monovinyl-substituted aromatic compound. The composition contains a low molecular weight polyalkene, which in combination with the hydrogenated thermoplastic elastomer results in an unexpected improvement in normally competing properties, for instance, improved hardness and improved elongation. The composition contains a conventional modifying resin, and as is well known in the art, must also contain a filler to provide reinforcement, to reduce cost or to prevent tack. Other conventional ingredients such as pigments, stabilizers, and, if in solvent release formulations, a solvent can also be present.

The inventive sealant formulations generally exhibit higher modulus, tensile, elongation, hardness and peel strength compared to prior art formulations containing other well known plasticizers. Since the inventive sealant formulations are based upon rubbery copolymers which have been hydrogenated to remove a substantial portion of the olefinic unsaturation, the environmental resistance of the resultant sealants is considerably better than prior art sealant formulations based upon the polymers containing substantial amounts of olefinic unsaturation.

The hydrogenated thermoplastic elastomer copolymers of conjugated dienes and monovinyl-substituted aromatics generally useful in this invention are of the structure ABA or $(AB)_nY$ wherein A represents a block of poly(monovinyl aromatic), B represents a block of poly(conjugated diene) before hydrogenation, Y represents a residue of a polyfunctional coupling agent or a polyfunctional initiator and n is a number having a value of at least 2 preferably from 2 to 4, these polymers being radial when n is greater than 2. A and B generally represent pure homopolymer blocks, but it is also within the scope of this invention to include those block copolymers containing the well known "tapered" blocks.

Monovinyl-substituted aromatic compound monomers useful in the preparation of the A blocks of the above-described copolymers generally contain from 8 to 12 carbon atoms per molecule. Examples of such monomers include styrene, 3-methylstyrene, 4-n-propylstyrene, 1-vinylnaphthalene, 2-vinylnaphthalene and the like. Styrene is preferred.

Useful conjugated dienes for the preparation of the B blocks of the above-described copolymers prior to hydrogenation include those generally containing from 4 to 8 carbon atoms per molecule. Examples of such monomers include 1,3-butadiene, isoprene, 2,4-hexadiene, 3-ethyl-1,3-pentadiene, and the like. 1,3-Butadiene and isoprene are preferred, 1,3-butadiene being most preferred.

ABA block copolymers are generally prepared by methods well known in the art such as by the sequential addition of monomers to a system utilizing an organomonolithium initiator as described in U.S. Pat. No. 3,639,521, the disclosure of which is hereby incorporated by reference.

(AB)$_n$Y block copolymers are prepared using polyfunctional organolithium initiators or polyfunctional coupling agents by well known methods such as are adequately described in U.S. Pat. Nos. 3,030,346, 3,280,084, 3,351,905, 3,281,383, and 3,639,521, the disclosures of which are hereby incorporated by reference.

When Y is a residue of polyfunctional coupling agent, it is derived from treating agents containing at least 2, preferably from 2 to 4 functional groups per molecule. Useful coupling agents include multiepoxides, multiamines, multiisocyanates, multialdehydes, multiketones, multiesters, multianhydrides and and multihalides. Specific examples of such agents include benzene-1,4-diisocyanate, naphthalene-1,2,5,7-tetraisocyanate, tri(1-aziridinyl)phosphine oxide, epoxidized soybean oil, epoxidized linseed oil, 1,4,7-naphthalene tricarboxaldehyde, 1,4,9,10-anthracenetetrone, pyromellitic dianhydride, trimethyl tricarballylate, dichlorodimethylsilane and silicon tetrachloride.

When Y is a residue of a polyfunctional initiator it is derived from compounds of general formula $R(Li)_x$ where x is an integer of from 2 to 4 and R is an aliphatic, cycloaliphatic or aromatic radical containing from 1 to 20 carbon atoms. Specific examples of useful polyfunctional initiators include dilithiomethane, 1,4-dilithiobutane, 1,20-dilithioeicosane, 1,2-dilithio-1,2-diphenylethane, 1,4-dilithiocyclohexane, 1,3,5-trilithiopentane, 1,2,5-trilithionaphthalene, 1,3,5,8-tetralithiodecane, and 1,2,3,5-tetralithiocyclohexane.

While a distinction has been made here between ABA polymers made by sequential polymerization and (AB)$_n$Y polymers which would be linear when n is 2, this distinction is not always made in the art since ABA polymers as defined herein and (AB)$_n$Y polymers where n is 2 have essentially identical properties in most respects.

The A/B weight ratio in the above-described polymers will generally be in the range of 50/50 to 5/95 and preferably in the range 40/60 to 15/85. The block copolymers will generally have a weight average molecular weight within the range of 10,000 to 750,000 and preferably within the range of 50,000 to 350,000.

Procedures for hydrogenating unsaturated polymers are well known in the art. An example of such a system which is convenient to employ is the catalytic hydrogenation of a polymer solution using a reduced nickel catalyst (such as triethylaluminum/nickel octanoate). Such procedures are described in U.S. Pat. No. 3,696,088, the disclosure of which is hereby incorporated by reference.

The hydrogenated block copolymers of this invention are generally hydrogenated to the extent that no more than 5 percent of the original olefinic unsaturation remains. It is preferred that no more than 2 percent of the original olefinic unsaturation remains after hydrogenation. The use of well known hydrogenation techniques such as those employing the reduced nickel catalyst described above generally results in the hydrogenation of no more than 5 percent of the original aromatic unsaturation present in the polymer.

When using the thermoplastic elastomer or elastomers according to applicant's invention, there is no need for rubber requiring chemical curing and thus no need for curing agents. Small amounts of the rubbers can be tolerated but generally said thermoplastic elastomer or elastomers will constitute at least 75 percent by weight of the total rubbery component. Thus, one advantage for the invention is that the rubbery component can be substantially free of rubber requiring chemical crosslinking.

Low molecular weight (generally liquid at room temperature) polyalkenes useful as plasticizers in the inventive sealant formulations include homopolymers of ethylene, propylene, 1-butene, cis-2-butene, trans-2-butene, isobutylene, pentenes, etc. as well as copolymers and terpolymers thereof in all proportions and mixtures thereof in all proportions, said polymers generally possessing weight average molecular weights from 200 to about 3,000 and preferably from 300 to 2,000. The useful polyalkenes are readily prepared using polymerization techniques well known in the art, and many are commercially available.

Modifying resins which are useful in the selant formulation of this invention are generally those which are well known in the sealant art, such as modified and unmodified rosin and rosin esters, esters of polymerized rosin, polyterpene resins, terpene-phenolic resins, coumarone-indene resins, diolefin-olefin resins, phenolaldehyde resins, aromatic resins, and the like.

Fillers which are well known in the sealant art are likewise useful as fillers in the present invention. Examples of such fillers include calcium carbonate, aluminum silicate, clay, talc, kaolin, silica, ground up polymers, etc., and mixtures thereof. Such fillers frequently reinforce the sealant.

Pigments are frequently employed in the formulations of the present invention for the aesthetic value of the sealant as well as their reinforcing properties. Any pigments can be employed to impart whatever colorations are desired to the final sealant. Carbon black and titanium dioxide are well known pigments suitable for such use.

It is usually desirable to include stabilizers in the inventive formulations. Such stabilizers include the well known antioxidants and antiozonants, as well as ultraviolet and thermal stabilizers. Hindered phenols, substituted phosphites, phenolic phosphites, dialkyl thiodipropionates, nickel dialkyldithiocarbamates, and the like and mixtures thereof are examples of types of stabilizers which are particularly beneficial in the present invention.

When application of the inventive sealant formulation as a solvent release system is desired, saturated aliphatic, saturated cycloaliphatic or aromatic hydrocarbons are conveniently employed as solvent. Those common hydrocarbon solvents generally contain from 5 to 8 carbon atoms per molecule. Solvents, such as pentane, hexane, heptane, octane, cyclohexane, benzene, toluene, and the xylenes, are especially useful.

It is also within the scope of this invention to apply the inventive sealant to a substrate as a hot-melt in which case no solvent is employed or as an emulsion in which case water and suitable emulsifiers are employed. Since the sealant of this invention does not require chemical crosslinking, the term "set" is used herein to mean the setting of the sealant after application, by evaporation of the diluent or cooling to below the melting point of the rubber, which setting is analogous to the curing of chemically crosslinkable sealants.

The sealant formulation of this invention is useful in sealing a wide variety of substrates. All common materials of construction, such as glass, aluminum, steel, concrete, brick, rock, ceramic, wood, etc., can be sealed by use of the inventive sealant.

The above-described ingredients of the inventive formulation are generally employed in amounts given in the following recipe.

RECIPE

| Ingredient | Parts By Weight Broad | Preferred |
|---|---|---|
| Hydrogenated thermoplastic elastomer | 100 | 100 |
| Modifying Resin | 10-300 | 25-150 |
| Plasticizer | 10-200 | 25-175 |
| Filler | 25-250 | 50-200 |
| Pigment | 0-40 | 5-30 |
| Stabilizer | 0-10 | 0.5-5 |
| Solvent | 0-300 | 0-250 (or 25-250 for solvent systems) |

EXAMPLE I

The following inventive and comparative runs were conducted to demonstrate a solvent-release sealant formulation made in accordance with this invention (Run 1) and to compare it to prior art formulations (Runs 2 and 3).

RECIPE

| Ingredient | Parts by Weight |
|---|---|
| Hydrogenated thermoplastic elastomer[1] | 54.25 |
| VT/AMS[2] (modifying resin) | 36.1 |
| GEPR[3] (modifying resin) | 18.2 |
| Plasticizer | 42 |
| Calcium carbonate | 59.5 |
| Talc | 35.0 |
| Titanium dioxide | 10 |
| Toluene | Variable |

[1]Hydrogenated 70/30 butadiene/styrene teleblock copolymer coupled with epoxidized soybean oil. Molecular weight (weight average) - 95,000.
[2]Vinyltoluene/α-methylstyrene copolymer.
[3]Glycerol ester of polymerized rosin.

In Table I data are tabulated which were obtained by evaluation of the sealant formulations. The sealant of run 1 (inventive) was based on a hydrogenated butadiene/styrene teleblock copolymer and contained a low molecular weight polybutene as plasticizer. The sealants of runs 2 and 3 (comparative) were based on the same hydrogenated copolymer as run 1 but contained either a chlorinated paraffin or a mixed dibutyl phthalate/methyl ester of rosin as plasticizer.

Table I

| Run No. | 1 (Inv) | 2 | 3 |
|---|---|---|---|
| Plasticizer | PB[1] | CP[2] | DBP/MER[3] |
| Toluene, part by weight | 63.9 | 63.9 | 110 |
| Bulk viscosity, centipoise[4] | >8×10$^6$ | 3.6×10$^5$ | 3.78×10$^6$ |
| Heated at 85° C for 16 hours | | | |
| 50% Modules, psi[5] | 170 | 68.5 | 60 |
| 100% Modules, psi[5] | 167.5 | 78.5 | 55.5 |
| Tensile, psi[5] | 159 | 68.5(46.5)[9] | 43.25 |
| Elongation, %[5] | 229.5 | 160 | 130 |
| Hardness, Shore A[6] | 70 | 53 | 55 |
| Tack[7] | non-tacky | non-tacky | non-tacky |
| Peel strength, pounds per inch width[8] | 19.75 | 17.5[10] | 11.7 |

[1]Polybutene (Indopol L-14 from Amoco). M.W.-320
[2]Chlorinated paraffin (Chlorafin 50 from Hercules), 50 weight percent chlorine.
[3]Dibutyl phthalate/methyl ester of rosin.
[4]Measured with Brookfield Viscometer at 25° C at 0.5 to 5 rpm with no. 7 spindle.
[5]ASTM D-888-56T.
[6]ASTM D-2240-68
[7]As determined by touching finger to dried sealant.
[8]Specimens prepared and tested according to a modification of National Bureau of Standards Federal Specification TT-S-230b, said modification being drying of specimen in air at 85° C for 16 hours prior to testing.
[9]Results of duplicate determinations.
[10]Adhesive and cohesive failure were observed thus producing anomalous results.

The above data demonstrate the improved properties of tensile, modulus, elongation, hardness and peel strength of the inventive sealant formulation (run 1) compared to prior art sealants (Runs 2 and 3).

EXAMPLE II

The following inventive runs illustrate sealants in a hot melt application.

RECIPE

| Ingredient | Parts by Weight (pbw) |
|---|---|
| Hydrogenated teleblock copolymer[1] | Variable |
| Plasticizer | Variable |
| VT/AMS (Modifying resin) | Variable |
| PA[2] (Modifying resin) | Variable |
| Calcium carbonate | 40.3 |
| Titanium dioxide | 26.8 |
| Zinc oxide | 13.5 |
| Stabilizer[3] | Variable |

[1]See footnote 1, Example I Recipe.
[2]Pexalyn AO72 - cycloaliphatic resin from Hercules.
[3]4/1 Weight ratio Agerite Geltrol (Vanderbilt)/dilauryl thiodipropionate (DLTDP). Agerite Geltrol is an alkylated-arylated bisphenolic phosphite.

The data in Table II were obtained by evaluation of the inventive hot melt sealant formulations. The ingredients are shown in parts by weight (pbw).

Table II

| | 4 | 5 | 6 | 7 |
|---|---|---|---|---|
| Hydrogenated copolymer, pbw | 35 | 35 | 45 | 45 |
| Plasticizer A,[1] pbw | 77.1 | 77.1 | 77.1 | |
| Plasticizer B,[2] pbw | | | | 67.1 |
| VT/AMS, pbw | 45 | 30 | 30 | 45 |
| pa, pbw | 45 | 60 | 60 | 45 |
| Stabilizer, pbw | 4 | 4 | —[4] | 2.1 |
| Melt Viscosity, centipoise[3] | 10,500 | 4,500 | 4 | — |
| 50% Modulus, psi | 45 | 26.5 | 23.5 | 94 |
| Tensile, psi | 145.5 | 106 | 103 | 421.5 |
| Elongation, % | 470 | 555 | 605 | 470 |
| Hardness, Shore A | 43 | 20 | 20 | 55 |
| Tack | non-tacky | VVS[5] | VS[6] | non-tacky |

[1]Polybutene (Indopol L-100 from Amoco). M.W.-460.
[2]Polybutene (Indopol H-100 from Amoco). M.W.-920.
[3]Measured with Brookfield Viscometer at 177° C at 20 to 50 rpm with no. 29 spindle.
[4]Dash denotes "not determined".
[5]Very, very slightly tacky.
[6]Very slightly tacky.

The above data are illustrative of the hot melt sealants available through this invention. Inventive runs 4, 5, 6 and 7 demonstrate the variety of properties available through variation in proportions of ingredients and variation of molecular weight of polyalkene.

While this invention has been described in detail for the purpose of illustration, it is not to be construed as limited thereby but is intended to cover all changes and modifications within the spirit and scope thereof.

I claim:

1. A sealant composition comprising:
   a rubbery ingredient consisting essentially of at least one hydrogenated thermoplastic elastomer, said elastomer having a formula selected from ABA and $(AB)_n Y$ where A represents a block of polymerized monovinyl-substituted aromatic component, B represents a block of polymerized conjugated diene before hydrogenation, Y represents a residue of a polyfunctional coupling agent or a polyfunctional intiator, and n has a value of at least 2;
   a low molecular weight polyalkene plasticizer which is liquid at room temperature in an amount within the range of 10 to 200 parts by weight per 100 parts by weight of said hydrogenated thermoplastic elastomer;

a modifying resin selected from a group consisting of modified and unmodified rosin and rosin esters, esters of polymerized rosin, polyterpene resins, terpene-phenolic resins, coumarone-indene resins, diolefin-olefin resins, phenol-aldehyde resins, and aromatic resins, said resin being present in an amount within the range of 10 to 300 parts by weight per 100 parts by weight of said hydrogenated thermoplastic elastomer; and a filler selected from calcium carbonate, aluminum silicate, clay, talc, kaolin and silica, said filler being present in an amount within the range of 25 to 250 parts by weight per 100 parts by weight of said hydrogenated thermoplastic elastomer.

2. A composition according to claim 1 wherein said thermoplastic elastomer has a weight ratio of monovinyl-substituted aromatic compound/conjugated diene within the range of 40/60 to 15/85.

3. A composition according to claim 2 wherein said monovinyl-substituted aromatic compound is styrene and said conjugated diene is selected from 1,3-butadiene and isoprene.

4. A composition according to claim 3 wherein said thermoplastic elastomer is hydrogenated to the extent that no more than 2 percent of the original aliphatic unsaturation remains and no more than 5 percent of the original aromatic unsaturation is hydrogenated.

5. A composition according to claim 4 wherein said plasticizer is present in an amount within the range of 25 to 175 parts by weight per 100 parts by weight of said hydrogenated thermoplastic elastomer;

said modifying resin is present in an amount within the range of 25 to 150 parts by weight per 100 parts by weight of said hydrogenated thermoplastic elastomer; and said filler is present in an amount within the range of 50 to 200 parts by weight per 100 parts by weight of said hydrogenated thermoplastic elastomer.

6. A composition according to claim 5 wherein said modifying resin is a vinyltoluene/α-methylstyrene copolymer, said filler is calcium carbonate, and wherein said composition contains toluene as a solvent.

7. A composition according to claim 6 wherein said polyalkene is a polybutene having a weight average molecular weight within the range of 300 to 2,000.

8. A composition according to claim 1 comprising in addition a solvent to give a solvent-release sealant formulation.

9. A composition according to claim 1 wherein said polyalkene is a polybutene having a weight average molecular weight within the range of 300 to 2,000.

10. A sealant composition comprising:

a rubbery ingredient at least 75 weight percent of which is made up of at least one hydrogenated thermoplastic elastomer, said elastomer having a formula selected from ABA and $(AB)_nY$ where A represents a block of polymerized monovinyl-substituted aromatic component, B represents a block of polymerized conjugated diene before hydrogenation, Y represents a residue of a polyfunctional coupling agent or a polyfunctional initiator, and n has a value of at least 2;

a low molecular weight polyalkene plasticizer which is liquid at room temperature in an amount within the range of 25 to 175 parts by weight per 100 parts by weight of said hydrogenated thermoplastic elastomer;

a modifying resin selected from a group consisting of modified and unmodified rosin and rosin esters, esters of polymerized rosin, polyterpene resins, terpene-phenolic resins, coumarone-indene resins, diolefin-olefin resins, phenol-aldehyde resins, and aromatic resins, said resin being present in an amount within the range of 25 to 150 parts by weight per 100 parts by weight of said hydrogenated thermoplastic elastomer; and a filler selected from calcium carbonate, aluminum silicate, clay, talc, kaolin and silica, said filler being present in an amount within the range of 50 to 200 parts by weight per 100 parts by weight of said hydrogenated thermoplastic elastomer.

11. A sealant composition comprising:

a rubbery component comprising at least one hydrogenated thermoplastic elastomer, said elastomer having a formula selected from ABA and $(AB)_nY$ where A represents a block of polymerized monovinyl-substituted aromatic component, B represents a block of polymerized conjugated diene before hydrogenation, Y represents a residue of a polyfunctional coupling agent or a polyfunctional initiator, and n has a value of at least 2, said rubbery component being substantially free of rubber requiring chemical crosslinking, said composition containing no crosslinking agent;

a low molecular weight polyalkene plasticizer which is liquid at room temperature in an amount within the range of 25 to 175 parts by weight per 100 parts by weight of said hydrogenated thermoplastic elastomer;

a modifying resin selected from a group consisting of modified and unmodified rosin and rosin esters, esters of polymerized rosin, polyterpene resins, terpene-phenolic resins, courmarone-indene resins, diolefin-olefin resins, phenol-aldehyde resins, and aromatic resins, said resin being present in an amount within the range of 25 to 150 parts by weight per 100 parts by weight of said hydrogenated thermoplastic elastomer; and a filler selected from calcium carbonate, aluminum silicate, clay, talc, kaolin and silica, said filler being present in an amount within the range of 50 to 200 parts by weight per 100 parts by weight of said hydrogenated thermoplastic elastomer.

* * * * *